(12) United States Patent
Nashizawa

(10) Patent No.: US 9,177,396 B2
(45) Date of Patent: Nov. 3, 2015

(54) IMAGE PROCESSING APPARATUS AND IMAGE PROCESSING METHOD

(71) Applicant: CANON KABUSHIKI KAISHA, Tokyo (JP)

(72) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/909,434

(22) Filed: Jun. 4, 2013

(65) Prior Publication Data
US 2013/0329991 A1 Dec. 12, 2013

(30) Foreign Application Priority Data
Jun. 7, 2012 (JP) .................................. 2012-130098

(51) Int. Cl.
G06K 9/00 (2006.01)
G06T 11/00 (2006.01)
H04N 1/40 (2006.01)
H04N 1/60 (2006.01)

(52) U.S. Cl.
CPC .......... G06T 11/001 (2013.01); H04N 1/40093 (2013.01); H04N 1/6027 (2013.01)

(58) Field of Classification Search
CPC ......... G06T 5/002; G06T 5/003; G06T 5/004; G06T 5/006; G06T 5/20; G06T 11/001; G06T 13/00; G06T 2200/12; G06T 2207/10024; G06T 2207/20012; H04N 1/4052; H04N 1/52; H04N 1/644; H04N 5/217; H04N 5/23248; H04N 5/3572; H04N 9/045; H04N 9/646; H04N 9/78; H04N 9/79; H04N 9/7908; H04N 9/83; H04N 19/00096; H04N 19/00315; H04N 19/00775
See application file for complete search history.

(56) References Cited

U.S. PATENT DOCUMENTS

| 5,497,180 | A | * | 3/1996 | Kawakami et al. ............ 347/131 |
| 6,456,655 | B1 | * | 9/2002 | Suzuki ...................... 375/240.03 |
| 6,727,906 | B2 | * | 4/2004 | Lockeridge et al. ........... 345/581 |
| 7,092,570 | B2 | * | 8/2006 | Adams et al. .................. 382/205 |
| 8,314,863 | B2 | * | 11/2012 | Tachi ........................... 348/241 |
| 2002/0012003 | A1 | | 1/2002 | Lockeridge et al. |

FOREIGN PATENT DOCUMENTS

| JP | 11-232441 A | 8/1999 |
| JP | 2008-242533 A | 10/2008 |

* cited by examiner

Primary Examiner — Jose Couso
(74) Attorney, Agent, or Firm — Canon U.S.A., Inc., IP Division

(57) ABSTRACT

An image processing apparatus uses an edge component of an input image in which a little low-frequency component of a dark part is retained as a luminance signal, synthesizes a large blurring component generated from the input image as a color component, and realizes a taste of natural watercolor paintings in which gradation is not inverted from a bright part to the dark part when a color is placed on a rough line drawing in watercolor-like processing.

18 Claims, 18 Drawing Sheets

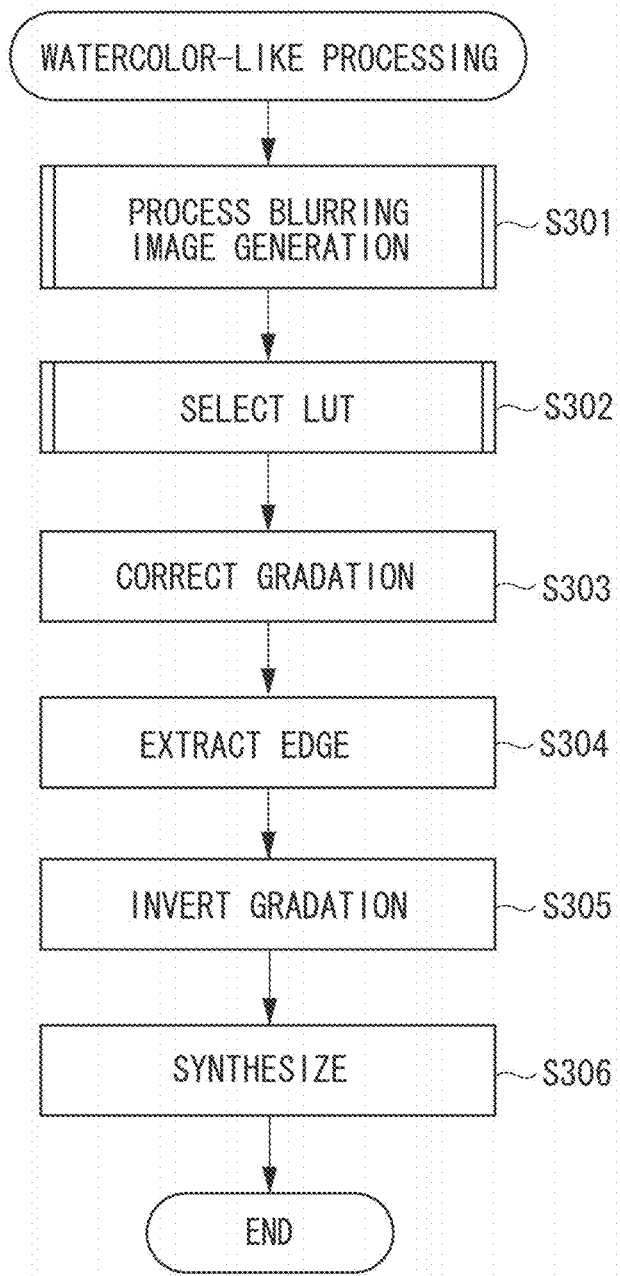

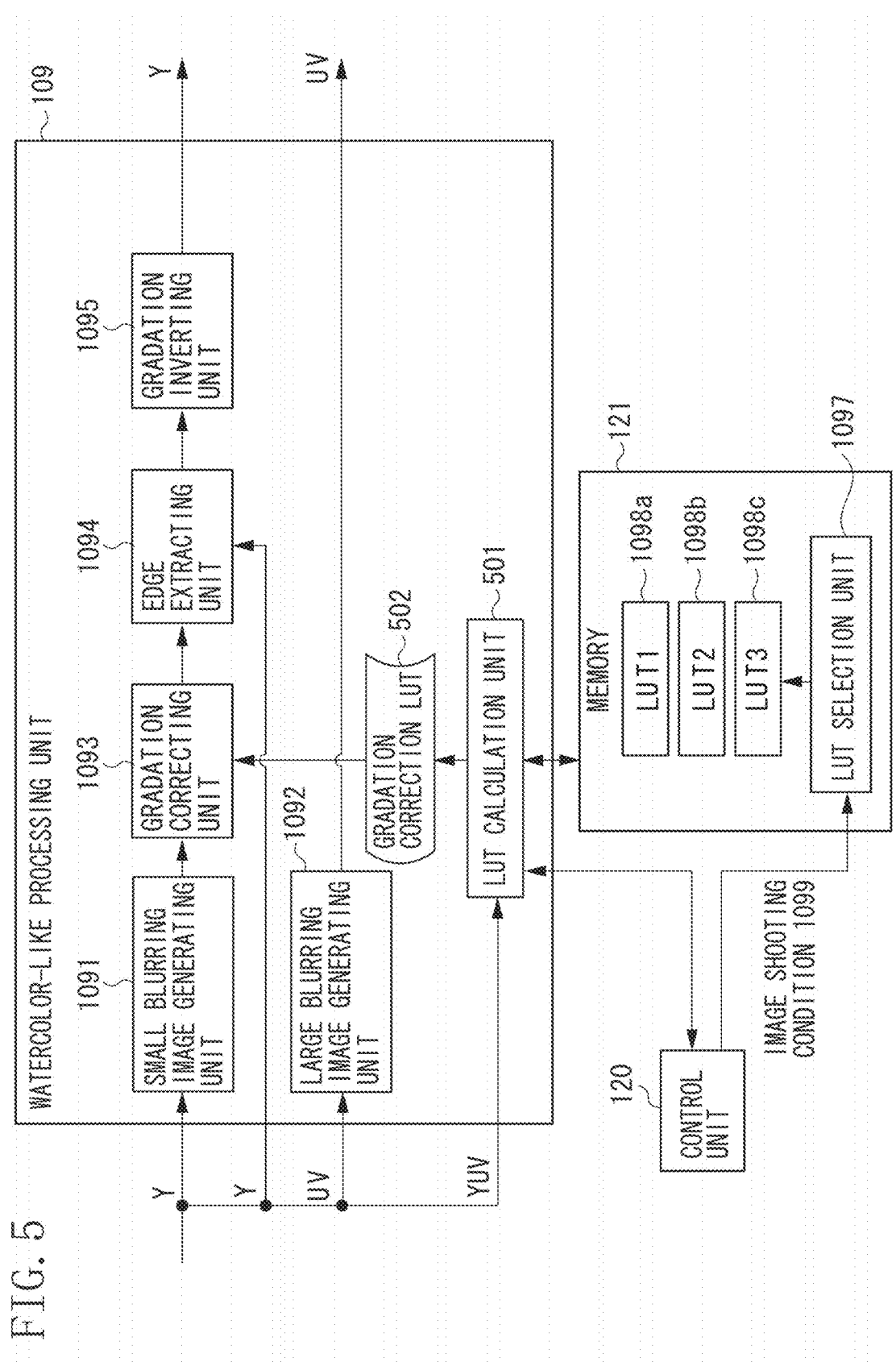

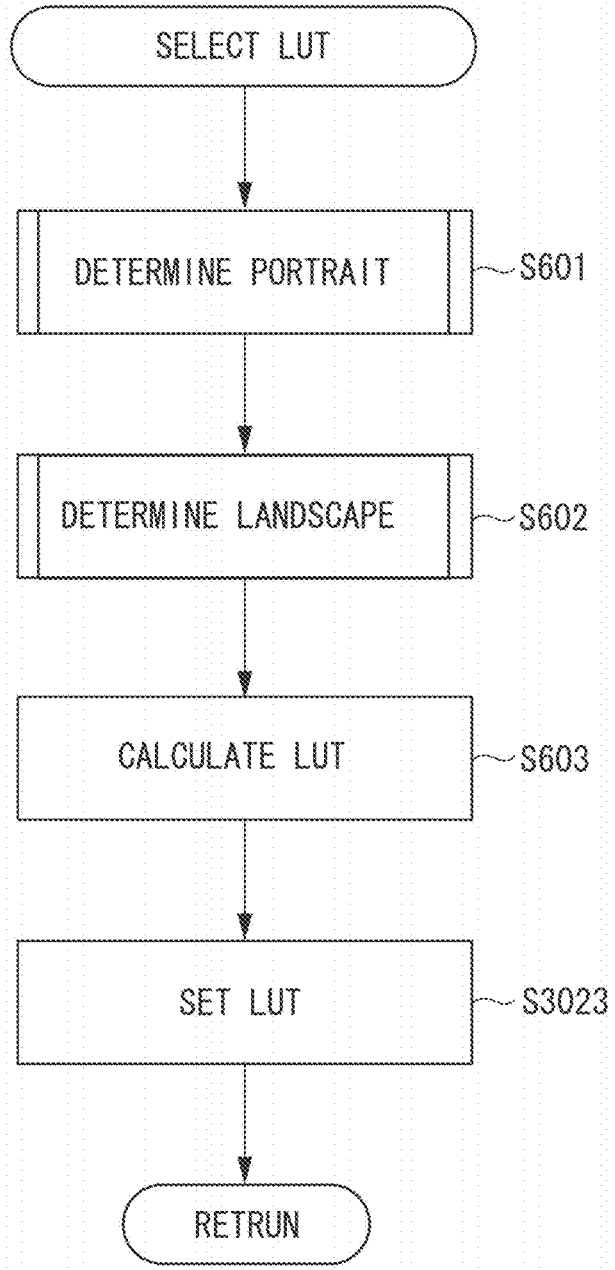

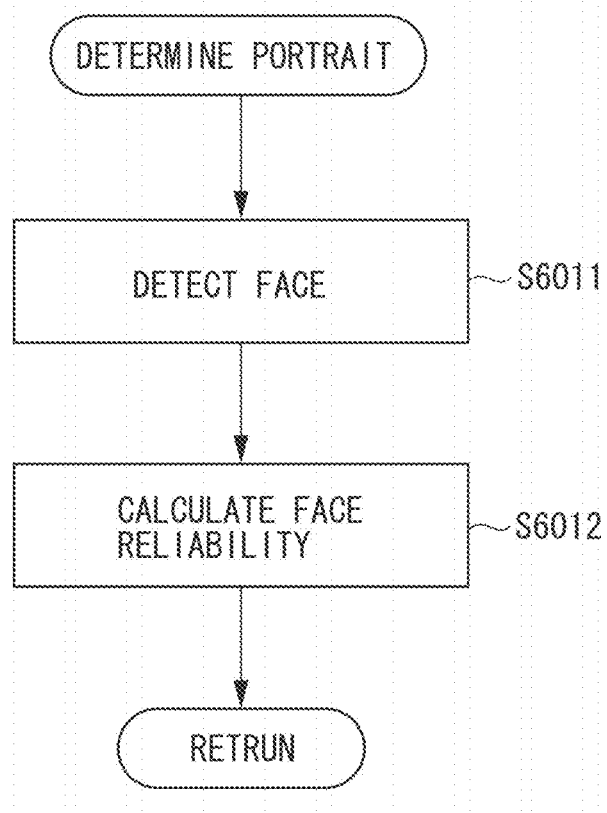

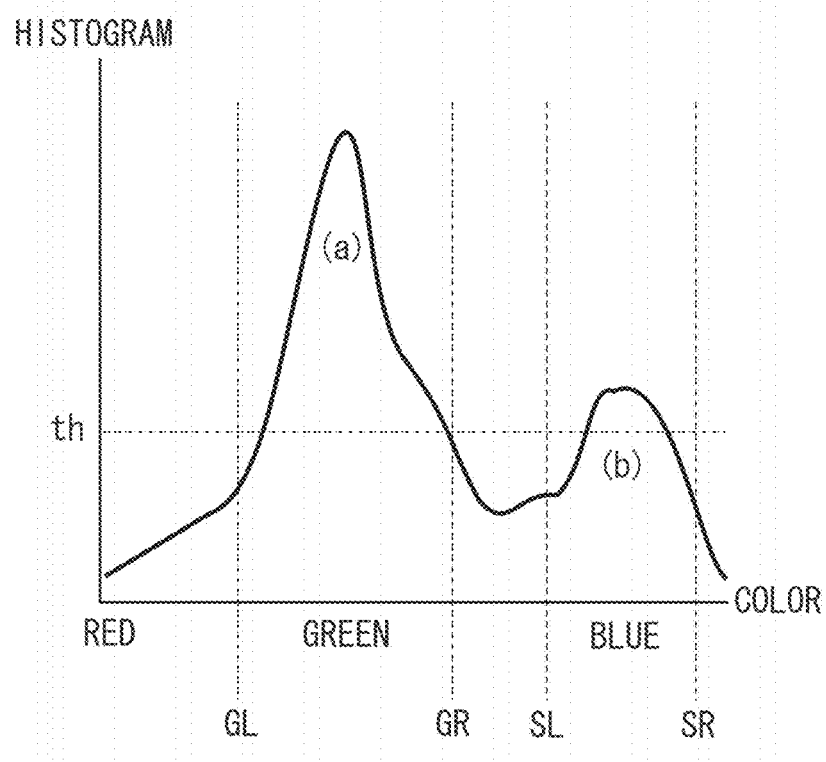

FIG. 13

| DEGREE OF EFFECT / IMAGE SIZE | IMAGE SIZE: LARGE | IMAGE SIZE: MEDIUM | IMAGE SIZE: SMALL |
|---|---|---|---|
| NUMBER OF SHRINKAGE TIMES — LUMINANCE COMPONENT | 3 | 2 | 1 |
| NUMBER OF SHRINKAGE TIMES — COLOR COMPONENT | 4 | 3 | 2 |

IMAGE PROCESSING APPARATUS AND IMAGE PROCESSING METHOD

BACKGROUND OF THE INVENTION

1. Field of the Invention

The present invention relates to an image processing apparatus and an image processing method that add an effect such as a watercolor painting to digital image data.

2. Description of the Related Art

Image processing can be performed to add a taste of a watercolor painting to digital image data. Features of the watercolor paintings may include a light color typical of the watercolor painting, a feeling of color bleeding, and further, a remaining rough line drawing. In Japanese Patent Application Laid-Open No. 2008-242533, when a predetermined closed area is colored, the colored area is moved in a random direction by a predetermined distance, the colored area is set at a location which deviates from the closed area, and the colored area is colored with a light color toward the periphery from the center of the colored area.

Thus, the Laid-Open No. 2008-242533 proposes a method that can express the color bleeding feeling of the paints. Further, in Japanese Patent Application Laid-Open No. 11-232441, images are spatially grouped according to a similar color and color subtraction is performed in the same group so that the images are represented by one same color. Thus, the Laid-Open No. 11-232441 proposes a method that expresses a taste of the watercolor painting which is realized by limited paints.

In the method of Japanese Patent Application Laid-Open No. 2008-242533, since all color information is first lost before coloring, the taste of the watercolor paintings may be expressed with the small number of colors. However, since the colored area has a color different from an input image, it is difficult to retain an atmosphere of the input image. In Japanese Patent Application Laid-Open No. 11-232441, while the number of colors is certainly decreased, boundaries between the groups, that is, edges, are expressed by generating a mixed color by colors represented by the respective groups. By this method, the boundaries are fused, and as a result, it is difficult to express the effect of the rough line drawing.

SUMMARY OF THE INVENTION

The present invention is directed to an image processing apparatus and an image processing method that authentically depict a rough line drawing and implement image processing for generating a color of watercolor paintings having a color of an input image as a basic color.

According to an aspect of the present invention, as discussed in claim 1, an image processing apparatus includes an extraction unit that extracts a high-frequency component and a low-luminance low-frequency component from luminance data of an input image, a color blurring unit that performs gradation processing to smooth data on color data of the input image, and an output unit that outputs image data in which the output from the extraction unit is used as luminance data and the output from the color blurring unit is used as color data.

According to another aspect of the present invention, as discussed in claim 14, an image processing method includes extracting luminance data including a high-frequency component and a low-luminance low-frequency component from luminance data of an input image, performing gradation processing to smooth data on color data of the input image, and outputting image data in which luminance data extracted by the extraction unit is used as luminance data and color data output from the color blurring unit is used as color data.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A, 3B, and 3C are flowchart illustrating an operation of the watercolor-like processing according to the first exemplary embodiment.

FIG. 5 is a block diagram illustrating a watercolor-like processing unit according to a second exemplary embodiment.

FIGS. 6A, 6B, and 6C are flowchart illustrating an operation of LUT selection processing according to the second exemplary embodiment.

FIG. 7 is a diagram illustrating a histogram used in landscape determination according to the second exemplary embodiment.

FIG. 13 is a table illustrating an example in which shrinkage times in generating blurring image correspond to an image size.

DESCRIPTION OF THE EMBODIMENTS

Various exemplary embodiments, features, and aspects of the invention will be described in detail below with reference to the drawings.

Hereinafter, a first exemplary embodiment of the present invention will be described.

In the exemplary embodiment, an example image processing apparatus to which the present invention may be applied includes an image processing apparatus having an image pickup system, such as a digital camera, a scanner, or the like. However, since the exemplary embodiment of the present invention is not limited thereto and may be applied to image data including color signals of a plurality of colors. The exemplary embodiment is not particularly limited to any specific apparatus if the image processing apparatus is capable of processing the image data. That is, the image processing apparatus may be an information processing apparatus such as a PC or an image forming apparatus such as a portable information terminal, and a printer. This is similarly applied to each exemplary embodiment described below.

Figure 1A:
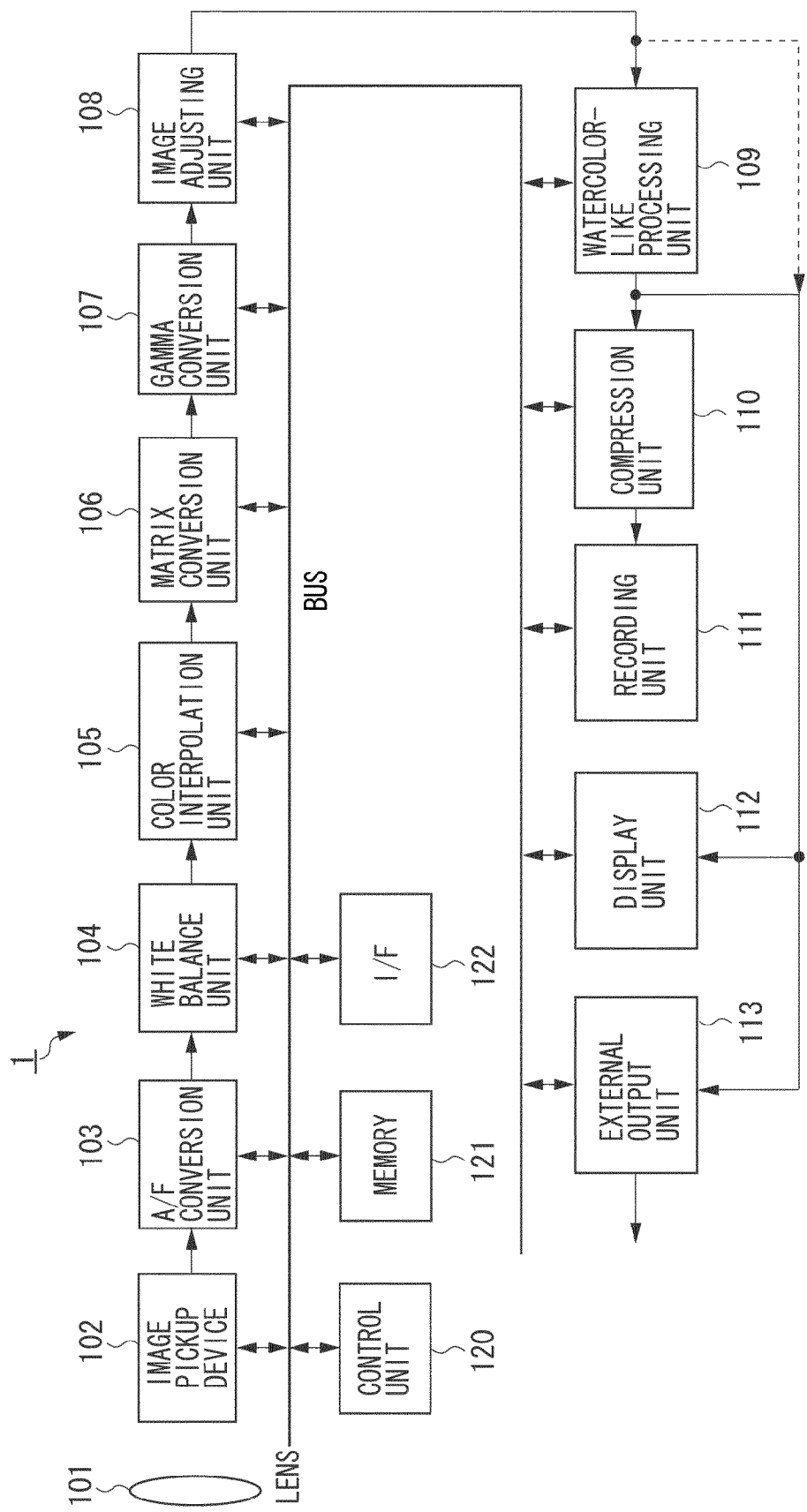
FIGS. 1A and 1B are block diagrams illustrating an image processing apparatus according to a first exemplary embodiment.

FIG. 1A illustrates a block diagram of a digital camera which is one example of an image processing apparatus 1 according to a first exemplary embodiment. Luminous flux from an object passes through an image forming optical system 101 including a lens, a diaphragm, and the like, is incident on an image pickup device 102, and photoelectrically converted to become an electrical signal, and thus, is output from the image pickup device 102. As the image pickup device 102, for example, a single plate color image pickup device having a general primary-color color filter is used.

The primary-color color filter is constituted by three types of color filters having transmission dominant wavelength ranges around 650 nm, 550 nm, and 450 nm, and captures color planes corresponding to respective bands of red (R), green (G), and blue (B). In the single plate color image pickup device, the color filters are spatially arranged in a mosaic shape for each pixel. Since each pixel acquires intensity in a single color plane, a color mosaic image is output from the image pickup device 102. An A/D conversion unit 103 converts an analog electrical signal output from the image pickup device into digital image data. In the exemplary embodiment, image data of 12 bits is generated for each pixel at this time.

A white balance processing unit 104 performs processing for setting a color of an area which is originally regarded as white in an image, to a white color. More specifically, gains which cause pixel values of colors R, G, and B of the area which needs to be white, to be the same value, are applied to the R, G, and B, respectively.

A color interpolation unit 105 interpolates the image data output from the white balance processing unit 104 with respect to the color mosaic image of the R, G, and B to generate color image data having color information of the R, G, and B in all pixels.

A matrix conversion unit 106 performs color conversion processing including color space conversion by a matrix operation. A gamma conversion unit 107 performs color conversion processing including gradation conversion by a gamma curve. In the exemplary embodiment, through the processing carried out by the matrix conversion unit 106, color spaces of the R, G, and B are converted into color spaces of 8-bit luminance (Y) data and color difference (U, V) data, and output from the matrix conversion unit 106 as YUV data.

Further, an image adjusting unit 108 performs processing for enhancing an appearance of an image. For example, the above processing primarily performs image correction processing such as noise reduction processing by a low-pass filter, chroma stressing and color correction processing by adding a gain, and edge stressing processing of extracting a high-frequency component by a high-pass filter, or the like and stressing the extracted high-frequency component. The image adjustment method is not limited to the exemplified method.

In addition, color adjustment depending on an image shooting condition 1099 or the object is performed by acquiring a total balance using the matrix conversion unit 106, the gamma conversion unit 107, and the image adjusting unit 108. In the exemplary embodiment, when the shot image is set to an image shooting mode to perform watercolor-like processing, a watercolor-like processing unit 109 performs watercolor-like image processing to be described below on the image data output from the image adjusting unit 108.

A compression unit 110 compresses the image data output from the watercolor-like processing unit 109 by a predetermined method such as JPEG and a recording unit 111 records the compressed image data in a recording medium such as a flash memory.

The image data output from the watercolor-like processing unit 109 is output also to a display unit 112 and displayed on a display medium such as liquid crystal. In this case, gamma processing or the like suitable for the display medium may be performed.

The image data output from the watercolor-like processing unit 109 is output also to an external output unit 113 and output to an external apparatus connected to the image processing apparatus 1 by a wired or wireless method.

When the image data is set in a general image shooting mode in which the watercolor-like processing is not performed, the image data output from the image adjusting unit 108 is directly input into the compression unit 110, the display unit 112, or the external output unit 113 as indicated by a dashed line.

A memory 121 stores the image data used in each processing unit, or image shooting information such as an F value of a diaphragm, a shutter speed, ISO sensitivity, a white balance gain value, and a set-up of a color gamut such as s-RGB. The stored data is appropriately read out and used by an instruction from a control unit 120.

The control unit 120 controls each unit via a BUS line and appropriately performs required operation processing.

An external operation, such as an instruction by a user is input into the image processing apparatus via an interface I/F 122 and the control unit 120 receives the input operation to perform the operation or control each unit.

Hereinafter, an image processing method of watercolor-like processing of the exemplary embodiment of the present invention, and a configuration of an image processing circuit implementing the image processing method will be described with reference to the block diagram illustrating details of the watercolor-like processing unit 109 of FIG. 1B. In the exemplary embodiment, a basic watercolor-like effect is implemented by mixing an edge component extracted from an input image as a luminance component and the input image with a gradated blurring component as a color component. However, the luminance component is not comprised solely of the extracted edge component. A low-frequency component is retained with respect to low-luminance data in some degree to achieve the watercolor-like effect in which natural gradation is reproduced from a bright part up to a dark part.

First, the luminance (Y) data among the image data input from the image adjusting unit 108 is input into a small blurring image generating unit (luminance blurring unit) 1091 and an edge extracting unit 1094, and the color difference (UV) data is input into a large blurring image generating unit (color blurring unit) 1092. The small blurring image generating unit 1091 and the large blurring image generating unit 1092 generate a small blurring image and a large blurring image by gradation processing (smoothing processing). Herein, the blurring image is an image which is blurred with respect to an input image, that is, an image in which a higher-frequency component than a predetermined frequency is removed. The small blurring image generated by the small blurring image generating unit 1091 is smaller in a degree of gradation than the large blurring image generated by the large blurring image generating unit 1092, and the high-frequency component remains.

Several methods of generating the blurring images are possible. For example, smoothing is vertically and laterally performed with a low-pass filter using a Gaussian filter coefficient. However, in order to implement a large blurring state anticipated in the watercolor-like processing in a single smoothing processing, a kernel size of the low-pass filter is increased, and as a result, a processing time becomes great. That is, it is not realistic to perform the processing on hardware of a camera. Therefore, in the exemplary embodiment, in order to shorten the processing time and acquire desired blurring, a shrinkage processing circuit and an enlargement processing circuit are combined with each other to generate the small blurring image and the large blurring image. A detailed operation associated with the blurring image generation processing will be described below by using the flowchart of FIG. 3B.

A gradation correcting unit 1093 performs gradation correction processing on the image data of the small blurring image generated by the small blurring image generating unit 1091. Several methods of the gradation correction processing are possible, but in the exemplary embodiment, correction by a one-dimensional look-up table (LUT) 1090 is performed in order to correct target luminance range gradation. An LUT selection unit 1097 selects the LUT 1090 based on an image shooting condition 1099 from LUTs 1098*a* to 1098*c* for each scene which has any one of features illustrated in FIGS. 4A to 4C.

The edge extracting unit 1094 generates an edge image from the small blurring image in which gradation is corrected, by using the input image. Herein, in order to extract the edge component from the input image, the input image may be just subtracted from the small blurring image. That is, the edge extracting unit 1094 is a subtraction circuit in the exemplary embodiment.

An image in which an area of two images having different frequency bands is extracted as an edge may be generated. In the edge image thus generated, the edge component has a value according to the intensity of the edge component and a low-frequency component which is not an edge has a signal close to 0 (8-bit range). In order to make the image have a taste of graphics as the rough line drawing, a gradation inversion unit 1095 inverts gradation of the image. The gradation inversion unit 1095 is configured of a circuit that performs gradation correction with, for example, a general tone curve and may perform the gradation correction according to the tone curve such as performing so-called negative and positive inversion. By gradation inversion, the edge component may be darkened and a non-edge component may be tinged with white.

Thus, the watercolor-like processing unit 109 uses the edge image in which gradation is inverted by the gradation inversion unit 1095 as the luminance (Y) data, and the large blurring image generated from the input image by the large blurring image generating unit 1092 as the color (UV) data, to output one image data.

The large blurring image output from the large blurring image generating unit 1092 is used for the color component to express watercolors straying from a line of the rough line drawing and bleeding.

Herein, the gradation correction processing performed by the gradation correcting unit 1093 in the exemplary embodiment will be described in more detail. First, an output image resulting when the gradation correcting unit 1093 does not perform the gradation correction processing is considered. The luminance data corresponding to the edge image acquired from (small blurring image)-(input image) is gradation-inverted to become luminance data of the final image. Therefore, the edge area is allocated to a low-luminance range and the non-edge area is allocated to a high-luminance range.

Since a colored area is expressed at comparatively high luminance by adding color data (color difference data) to the luminance data, it is possible to express a light color typical of a watercolor-like image. Meanwhile, since the area of the original dark (low-luminance) part is also inverted to be expressed at high luminance, a strong uncomfortable feeling may be evoked, for example, the pupil of the eye of a person is inverted to become a white eye.

Accordingly, in the exemplary embodiment, the gradation correction processing by the gradation correcting unit 1093 is performed on the luminance data of the small blurring image output from the small blurring image generating unit 1091. At that time, gradation correction is performed by increasing the output of the dark part so that the component of the dark part remains in the edge image. As a result, the component of the area of a dark part having lower luminance than predetermined luminance remains in the edge image output from the edge extracting unit 1094. That is, since an edge image (luminance data) including the high-frequency component and the low-luminance low-frequency component can be extracted from the luminance data of the input image, a watercolor-like image having a less uncomfortable feeling in the final image may be generated.

Figure 4A:
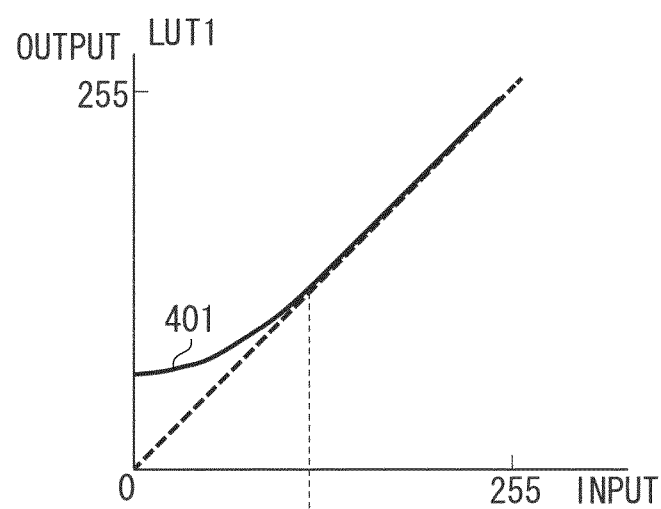
FIGS. 4A, 4B, and 4C are diagrams illustrating an input/output feature of an LUT used in gradation correction.

More specifically, as illustrated in FIG. 4A, the gradation correcting unit 1093 performs gradation correction by using an LUT having a characteristic 401 such as slightly increasing the output of the dark part. Herein, a horizontal axis represents an input signal and a vertical axis represents an output signal.

By performing the gradation correction having the characteristic 401 of FIG. 4A, the edge image output from the edge extracting unit 1094 at a subsequent stage can be made an edge image in which the low-frequency component slightly remains with respect to the dark part.

As the characteristic of the LUT, the vicinity of the dark part is preferably retained in the edge image output from the edge extracting unit 1094 as illustrated in any one of FIGS. 4A to 4C including a characteristic to be described below, but as the characteristic of the LUT, as long as a pixel value of the output signal is equal to or more than the pixel value of the input signal, the output of the dark part may be increased even to a medium and high luminance range. However, in this case, the luminance data output from the edge extracting unit 1094 includes more low-frequency components regardless of the luminance range and the taste of the rough line drawing fades away.

FIG. 2 illustrates an image view of an image (data) after processing in each step of the watercolor-like processing in the watercolor-like processing unit 109. FIG. 2A illustrates a sample of an image constituted by YUV data which is output from the image adjusting unit 108 and input into the watercolor-like processing unit 109. FIG. 2B illustrates an image after gradation processing by the small blurring image generating unit 1091 and FIG. 2C illustrates an image after gradation processing by the large blurring image generating unit 1092. In FIG. 2C, gradation processing is performed on the color difference (UV) signal from among image signals, however, an image in which a luminance signal can be acquired together is illustrated in order to show a difference in degree of the gradation processing.

Figure 2A:
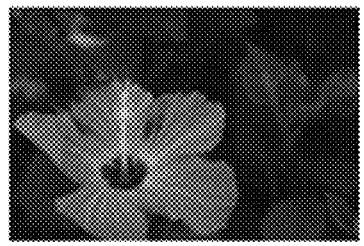
FIGS. 2A to 2G are image graphics of an image after processing in each step of watercolor-like processing according to the first exemplary embodiment.
Figure 2B:
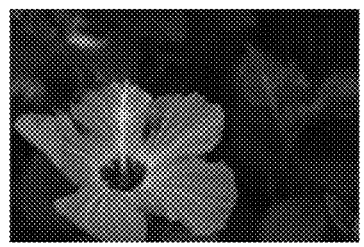
Figure 2C:
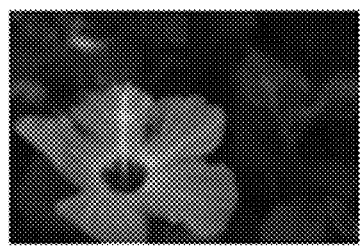
Figure 2D:
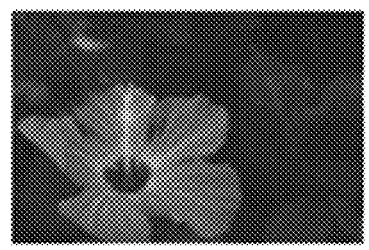

As illustrated in FIGS. 2C and 2D, in the exemplary embodiment, the degree of the gradation processing for the color difference signal is set to be larger than the degree of the gradation processing for the luminance signal. FIG. 2D is an image graphic of the luminance data output from the gradation correcting unit 1093. In FIG. 2D, a dark part shown in a background is brighter than in FIG. 2A by the gradation correction processing of increasing the output of the dark part.

Figure 2E:
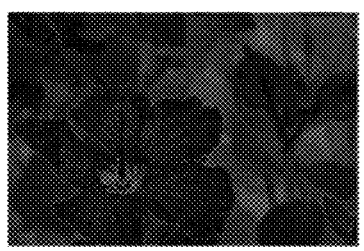
Figure 2F:
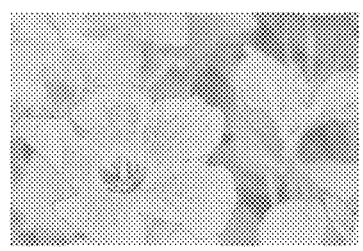
Figure 2G:
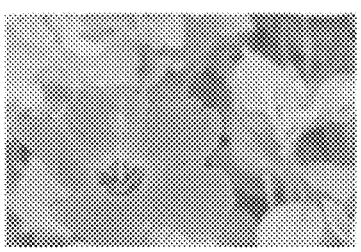

FIG. 2E is an image graphic of the luminance data output from the edge extracting unit 1094. In FIG. 2E, for example, a value is given so that an edge of a flower petal is white and a value is given also in the original dark part of the image. FIG. 2F is an image graphic of the luminance data output from the gradation inversion unit 1095. Referring to FIG. 2F, the dark part which remains together with the edge also surely remains as the dark part in the output image from the edge extracting unit 1094. FIG. 2G is an image graphic of a final output image of the watercolor-like processing unit 109. As can be seen from FIG. 2G, the area of the dark part in the original image is expressed as the dark part together with the edge.

Figure 4B:
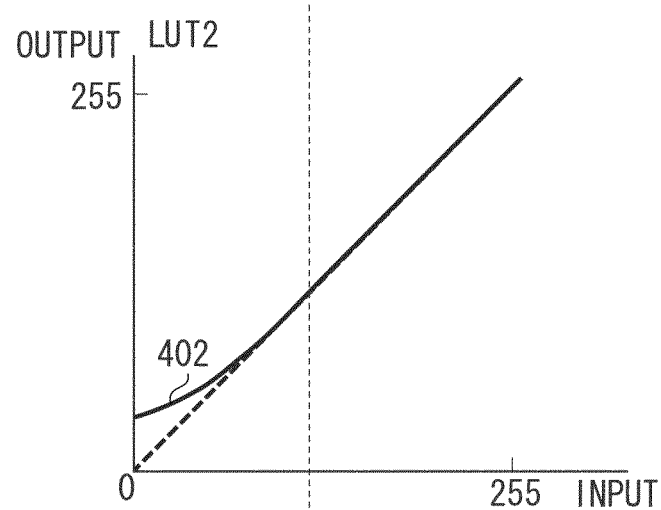
Figure 4C:
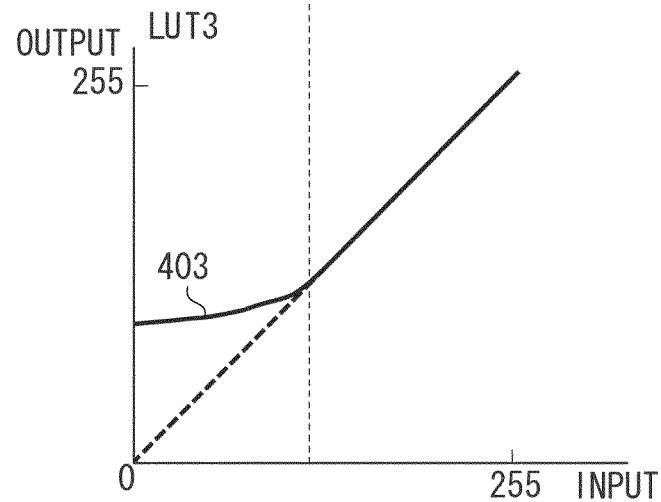

As described above, in the final image acquired by performing the gradation correction processing by the characteristics illustrated in FIGS. 4A to 4C, luminance gradation remains in the dark part including the low-frequency component. Therefore, the final image does not become bright and may be left as the dark part. Meanwhile, since the final image includes the low-frequency component, an element as a photograph remains, so that the final image retains realistic depiction and the final image backs away from a pictorial taste. Therefore, ideally, a luminance range in which the low-frequency component remains is appropriately controlled for each scene. Therefore, in the exemplary embodiment, an LUT suitable for a shot scene is selected and applied as described below.

Figure 1B:
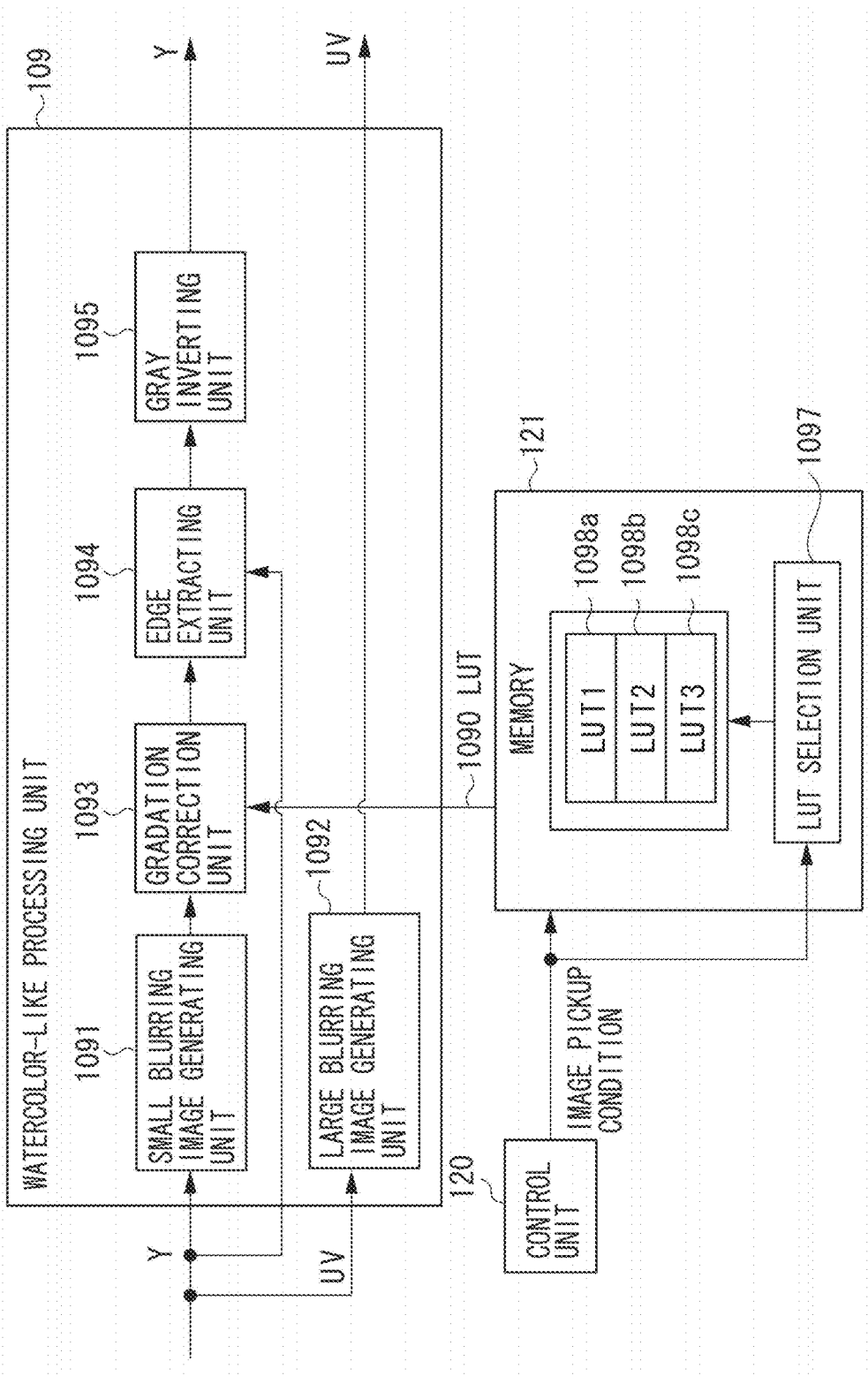

FIG. 3 is a flowchart illustrating an overall operation of the watercolor-like processing performed by the watercolor-like processing unit 109 illustrated in FIG. 1B. Each operation of the flowchart is performed by the control unit 120 or by each unit under an instruction from the control unit 120.

In step S301, the small blurring image generating unit 1091 and the large blurring image generating unit 1092 perform small blurring image generation processing on luminance data of an input image and large blurring image generation processing on color data of the input image, respectively.

In step S302, the LUT 1090 used in the gradation correcting unit 1093 is selected and set by the LUT selection unit 1097. In step S303, the gradation correcting unit 1093 performs gradation correction processing according to the selected LUT.

In step S304, the edge extracting unit 1094 performs the aforementioned edge extraction processing from luminance data of which gradation is corrected.

In step S305, the gradation inversion unit 1095 performs the aforementioned gradation inversion processing on the edge image output from the edge extracting unit 1094.

In step S306, the final image data is generated, in which the luminance (Y) data output from the gradation inversion unit 1095 is set as the luminance data and the color (UV) data output from the large blurring image generating unit 1092 is set as the color data, and the final image data is output as an output of the watercolor-like processing unit 109, and the process ends.

Figure 3B:
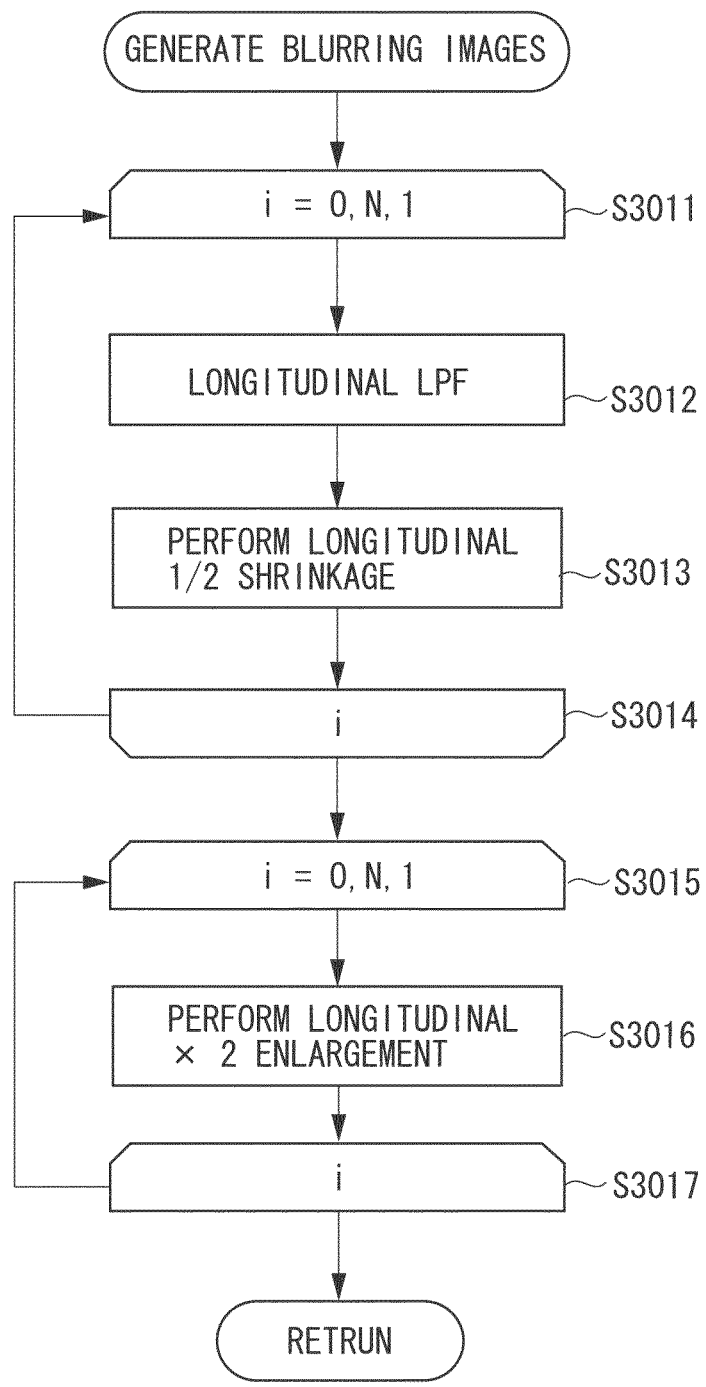

The blurring image generation processing of step S301 of FIG. 3 will be described in detail with reference to the flowchart of FIG. 3B. As described above, in the blurring image generation processing, shrinkage processing and enlargement processing are combined to generate a blurring image. More specifically, an image in which an information amount is reduced by performing the shrinkage processing is subsequently enlarged through interpolation, and as a result, the image becomes blurred.

First, a shrinkage size of a smallest shrinkage image is set according to a target size of blurring. For example, the large blurring image has a size corresponding to $1/16$ of each side of the input image (the number of pixels is decreased to $1/16$ on each of the length and the width). When the input image is shrunk to the size of $1/16$ of each side, $1/2$ shrinkage is repeated in a vertical direction and a horizontal direction N times (N=4) in steps S3011 to S3014. Herein, in order to prevent aliasing of a high-frequency component, so-called moire from occurring as a result of the shrinkage, the input image is smoothed by applying a low-pass filter (LPF) with a filter coefficient [1, 2, 1] in the vertical direction and the horizontal direction before the shrinkage (step S3012).

When the shrinkage processing is repeated up to N times, the enlargement processing is performed until the input image has an original size. The twofold enlargement processing is also repeated in the vertical direction and the horizontal direction N times in steps S3015 to S3017 similarly to the shrinkage processing. In the exemplary embodiment, side magnification in one shrinkage is carried out by a factor of $1/2$, but may be carried out by a factor of $1/4$ and is not limited thereto. However, the filter coefficient of the low-pass filter used at the same time needs to be appropriately changed in order to prevent the moire from occurring. For example, when the side magnification is decreased to $1/4$ the filter coefficient is set to [1, 4, 6, 4, 1].

Further, the shrinkage size of the smallest shrinkage image for generating the large blurring image needs to be smaller than the shrinkage size of the smallest shrinkage image for generating the small blurring image. In step S301, the blurring image generation processing is performed with N=N1 in the small blurring image generating unit 1091 and N=N2 (N1<N2) in the large blurring image generating unit 1092 in parallel.

Figure 3C:
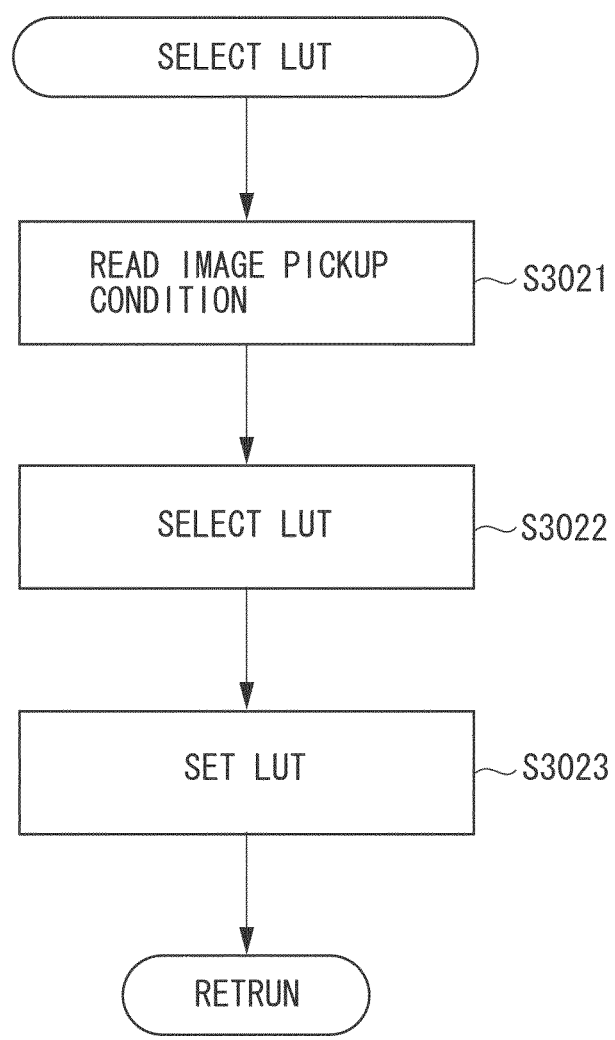

LUT selection processing of step S302 of FIG. 3A will be described in detail with reference to the flowchart of FIG. 3C. As described above, in the exemplary embodiment, the LUT suitable for a shot scene is selected and applied to the processing. For example, in a portrait scene such as an image of a person, gradation correction is performed by an LUT 3 having a characteristic 403 (for example, an output is increased at a darkest portion by 35%) which increases an output of a pixel value (dark part) showing lower than predetermined luminance as compared with other scenes, as illustrated in FIG. 4C.

In a scene of landscape image shooting, gradation correction is performed by an LUT 2 having a characteristic 402 (for example, an output is increased at the darkest portion by 13%) which does not increase a pixel value (dark part) showing lower than predetermined luminance as compared with other scenes, as illustrated in FIG. 4B.

In other general scenes, gradation correction is performed by an LUT 1 having a characteristic 401 (for example, the output is increased at the darkest portion by 23%) which normally increases the output of the dark part illustrated in FIG. 4A. However, basically, any LUT has a characteristic that performs gradation correction in which a pixel value as an output value is equal to or more than a pixel value as an input value.

In the exemplary embodiment, program priority (P), diaphragm priority (Av), time priority (Tv), manual (M) or the like is selectable by a mode dial or the like through an I/F 122 as an image shooting mode. Further, as an image shooting mode more suitable for a beginner, a categorized image shooting mode considering a kind of a scene, such as a full automatic, portrait mode, a landscape mode, a sport mode, a macro, and a nightscape is installed.

In step S3021, the control unit 120, for example, reads out an image shooting mode M from the memory 121 as an image shooting condition 1099. In the exemplary embodiment, since an image processing apparatus including an image shooting system is assumed, an image shooting condition 1099 set at the time of shooting the input image is stored in the memory 121 and read out.

Subsequently, in step S3022, the control unit 120 determines the read-out image shooting mode M and selects the corresponding LUT 1090 from the LUT 1098 for each scene stored in the memory 121. Among the image shooting modes, the LUT 1, the LUT 2, and the standard LUT 3 are selected in the case of the portrait mode, the landscape mode, and other modes, respectively. The LUT 1098 for each scene is held in advance, and as a result, calculation processing is reduced in image shooting, and high-speed continuous shooting may be performed without decreasing an image shooting frame speed. In order to select the LUT, the present invention is not limited the particular method described above. For example, image data generated by apparatuses other than the image processing apparatus, which is stored in the memory 121 may be processed. In this case, a header or an image shooting condition 1099 which is stored in association is read out. In particular, when a determinable image shooting condition 1099 is not stored, the LUT 3 for the standard is selected.

In step S3023, the control unit 120 sets the selected LUT 1090 to the gradation correcting unit 1093 and returns to the main processing.

As described above, in the exemplary embodiment, in the watercolor-like processing for adding the watercolor-like effect, the luminance data including the high-frequency component and the low-luminance low-frequency component is extracted from the luminance data of the input image and the final image data is obtained by adding gradated color data to generate a watercolor-like image. As a result, the rough line drawing is authentically depicted and image processing for generating the watercolor painting with the color of the input image as a basic color may be implemented.

Further, in the exemplary embodiment, since gradation correction is performed in a way that is suitable for the relevant image shooting condition, the watercolor-like image may be generated with a way which is appropriate for each scene.

In the first exemplary embodiment, when the gradation correcting unit 1093 performs gradation correction, the LUT for each scene is held as a preset, and the LUT is selected and gradation is corrected according to the image shooting condition of the scene, but in the second exemplary embodiment, the scene is determined by analyzing the input image and the gradation-correct LUT is calculated.

FIG. 5 is a block diagram illustrating the watercolor-like processing unit 109 in detail according to a second exemplary embodiment. Since processing details of a block having the same reference numeral as FIG. 1B are the same as FIG. 1B, a description of the block will be omitted. The second exemplary embodiment is different from the first exemplary embodiment in that an LUT calculation unit 501 is provided, an input image is analyzed by the LUT calculation unit 501 to determine a scene and an appropriate LUT 502 is calculated which corresponds to the determined scene.

FIG. 6 is a flowchart illustrating an operating example of the LUT selection processing in step S302 of FIG. 3 A according to the exemplary embodiment. Other overall watercolor-like processing is similar to the operation illustrated in FIG. 3.

In step S601, the control unit 120 and the LUT calculation unit 501 first perform portrait determination processing in order to calculate face reliability which indicates a probability that the scene is a portrait scene. In step S602, the control unit 120 and the LUT calculation unit 501 perform landscape determination processing in order to calculate a landscape degree which indicates a probability that the scene is a landscape scene.

In step S603, an LUT suitable for the input image is calculated by using a determination result in steps S601 and S602. More specifically, when the face reliability is 100%, the LUT illustrated in FIG. 4C is set. Meanwhile, when the face reliability is 0%, the LUT illustrated in FIG. 4B is set. When the face reliability is between them, the face reliability is interpolated and calculated from the LUTs illustrated in FIGS. 4B and 4C.

When the landscape degree is 100%, the LUT illustrated in FIG. 4A is set. Meanwhile, when the landscape degree is 0%, the LUT illustrated in FIG. 4B is set. When the landscape degree is between them, the landscape degree is interpolated and calculated from the LUTs illustrated in FIGS. 4A and 4B according to the landscape degree.

Further, it is possible that both of the face reliability and the landscape degree are high to some degree, but in this case, the LUT is set by prioritizing the face reliability. The calculated LUT is set in the gradation correcting unit 1093 in step S3023 similarly as in the first exemplary embodiment.

Next, FIG. 6B is a flowchart illustrating an operation of the portrait determination processing in step S601. First, face detection is performed by using a means, such as face identification by a Haar-Like feature amount (step S6011). Thereafter, the face reliability is calculated from the feature amount and returns to the main processing (step S6012). A reliable predetermined feature amount is set in advance to represent a face reliability of 100%, and in actual processing, the normalized face reliability using the feature amount is calculated.

Figure 6C:
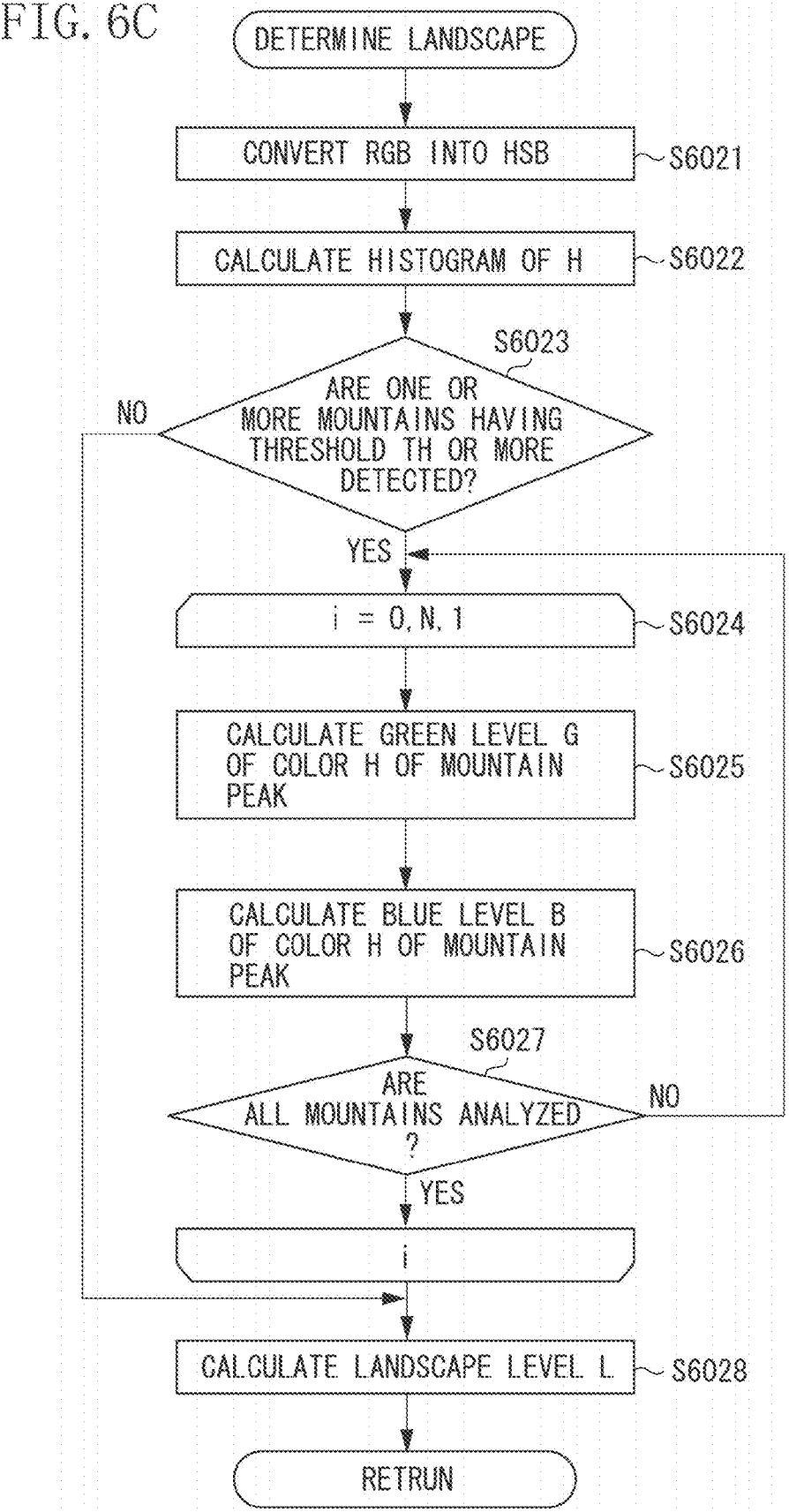

FIG. 6C is a flowchart illustrating an operating example of the landscape determination processing in step S602. A method of identifying a face by analyzing a histogram of a color signal of an input image, or the like may also be used (FIG. 8C).

In FIG. 6C, first, RGB of an input signal is converted into signals in HSB color space (step S6021). Subsequently, a hue histogram is calculated in an H component of an input image (step S6022). An example of the histogram calculated as above described is illustrated in FIG. 7, and the histogram is analyzed to determine whether the number of peaks having a threshold (th) or more is one or more (step S6023). When no mountain is detected ("NO" in S6023), the processing ends at the landscape degree of 0% (step S6028).

Meanwhile, when the mountain is detected ("YES" in S6023), a variable i is set presuming that the number of all detected peaks is N, in order to perform scene determination with respect to all of the detected peaks (step S6024). An initial value of the variable i is set as "1" and until the variable i is "N", the variable i is incremented by each "1".

Just after setting the variable i, a green level G for the hue of a first mountain is calculated (step S6025). When a condition of H=GR−GL is met, the green level G is 100% and as the green level G moves away from this condition, the green level G is decreased. In this case, when green level $G_i$>green level $G_{i-1}$, the green level G is updated to $G_i$.

Subsequently, a blue level B regarding whether the hue of the mountain is a blue sky is calculated (step S6026). When the condition of H=SL−SR is met, the blue level B is 100% and as the blue level B moves away from this condition, the blue level B is decreased. In this case, when blue level $B_i$>blue level $B_{i-1}$, the blue level B is updated to $B_i$.

Thereafter, it is determined whether hues of all of the peaks have been examined (step S6027). When the hues of all of the peaks have not been examined ("NO" in S6027), the processing returns to step S6025 in order to examine a hue of a subsequent mountain. When the hues of all of the peaks are examined, the landscape degree L is calculated from the green level G and the blue level B by an equation below and returns to the main processing (S6028).

$$L = \frac{G[\%] + B[\%]}{200[\%]} \quad (1)$$

Further, in addition to the above method, many alternative methods of analyzing and determining the scene of the image have been proposed. While these methods may also be used, a more detailed description will be omitted here.

As described above, according to the exemplary embodiment, in the watercolor-like processing for adding the watercolor-like effect, the luminance data including the high-frequency component and the low-luminance low-frequency component is extracted from the luminance data of the input image and the final image data is obtained by adding gradated color data to generate a watercolor-like image. As a result, the rough line drawing is authentically depicted and image processing of generating the watercolor painting with the color of the input image as a basic color may be implemented.

Further, in the exemplary embodiment, the input image is analyzed to determine the shot scene and the gradation correction is performed with an LUT which is optimized for each scene to retain an optimal dark part of the scene, so that the watercolor-like effect may be accurately produced.

In the first and second exemplary embodiments, the watercolor-like image is generated by using the extracted edge component as the luminance component. In a third exemplary embodiment, the luminance component is generated apart from the edge component.

Figure 8:
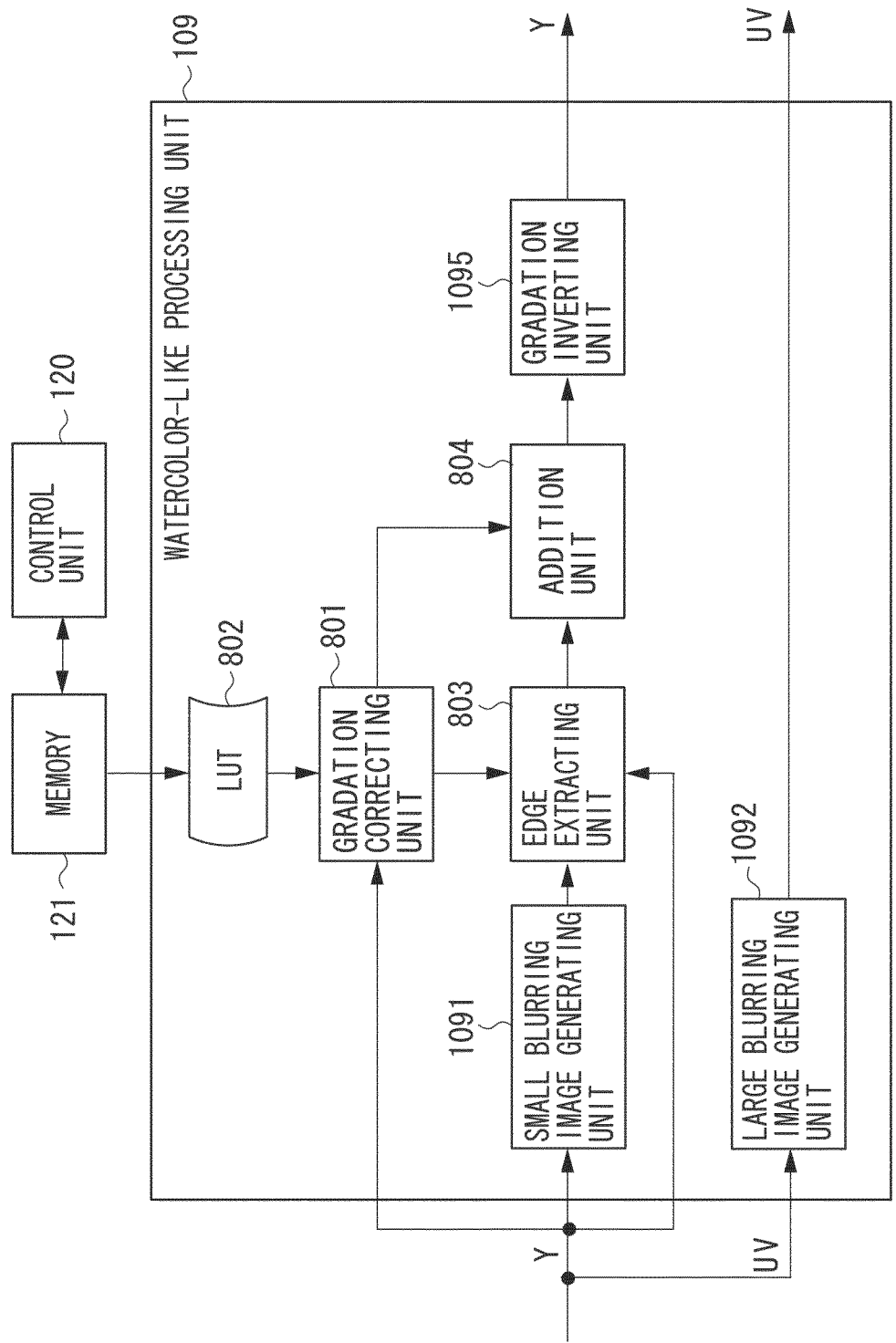
FIG. 8 is a block diagram illustrating a watercolor-like processing unit according to a third exemplary embodiment.

FIG. 8 is a block diagram of the watercolor-like processing unit 109 implementing watercolor-like processing according to a third exemplary embodiment. Since a block with the same reference numeral as FIG. 1B performs the same as FIG. 1B, a description of the block will be omitted.

The exemplary embodiment is different from the first and second exemplary embodiments in that luminance data input into an edge extracting unit 803 is not gradation-corrected. In this point, the edge component output from the edge extracting unit is an almost pure high-frequency component which includes almost no low-frequency component.

Figure 9:
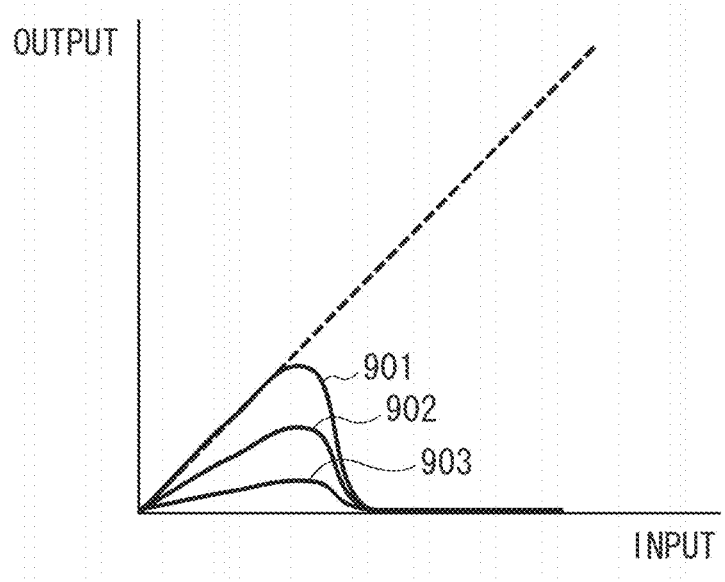
FIG. 9 is a diagram illustrating an input/output feature of an LUT used in gradation correction according to the third exemplary embodiment.

Meanwhile, a gradation correcting unit 801 performs gradation correction so that out of luminance data of an input image, a low-frequency component smaller than predetermined luminance remains. A method of the gradation correction is performed by conversion using a one-dimensional LUT 802 similarly to the first and second exemplary embodiments. In the exemplary embodiment, in order to acquire the effect corresponding to the LUTs referenced in the first and second exemplary embodiments, an LUT which follows a characteristic of 902 of FIG. 9 is referenced as the LUT 1, an LUT which follows a characteristic of 903 is referenced as the LUT 2, and an LUT which follows a characteristic of 901 is referenced as an LUT 3.

An addition unit 804 adds a luminance component (luminance data) and an edge component (edge data) after gradation correction is performed.

Figure 10:
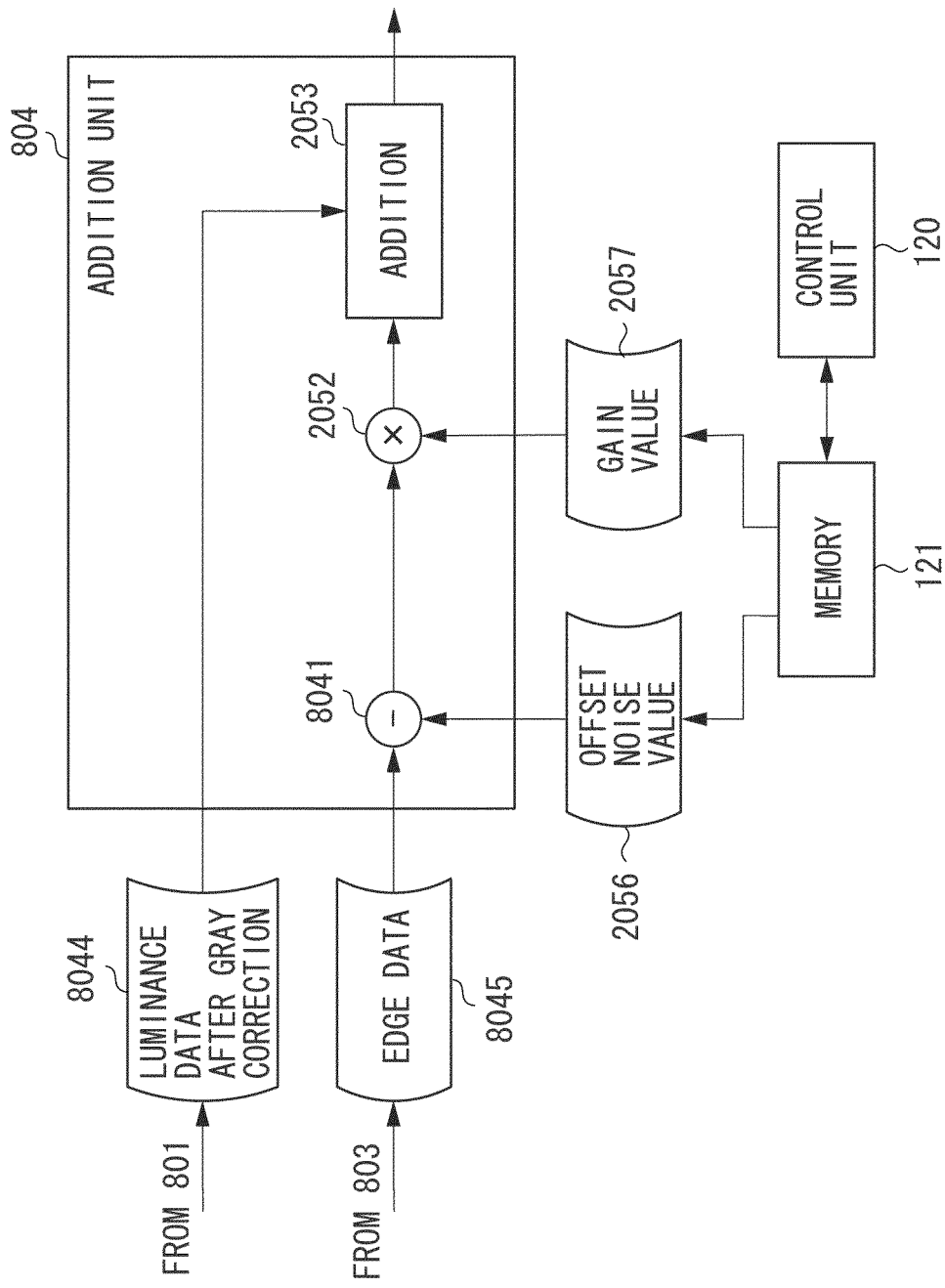
FIG. 10 is a block diagram illustrating an addition unit according to the third exemplary embodiment.

The addition unit 804 will be described in detail with reference to FIG. 10. An offset noise value and a gain value are read out from the memory 121 in advance. First, a subtracter 8041 subtracts a small offset noise value 2056 received from edge data, from the edge extracting unit 803. As a result, a small offset noise component can be removed. Since the small noise appears in the bright part after gradation inversion processing is performed and is not appropriate to express light transparence which is a feature of the watercolor-like, the minute noise is desirably removed in this step.

Subsequently, a multiplier 8042 multiplies a gain value 2057 by edge data 8045 in which the offset noise value is reduced. The intensity of the rough line drawing may be adjusted by the gain value. Thereafter, the edge data 8045 multiplied by the gain value and luminance data 8044 after gradation correction are added to acquire a final luminance component (luminance data).

As described above, in the exemplary embodiment, in the watercolor-like processing of adding the watercolor-like effect, the luminance data including the high-frequency component and the low-luminance low-frequency component is extracted from the luminance data of the input image and the final image data is obtained by adding gradated color data to generate a watercolor-like image. As a result, the rough line drawing is authentically depicted and image processing of generating the watercolor effect with the color of the input image as a basic color may be implemented.

Further, in the exemplary embodiment, in generating the luminance component, the edge component and the luminance component are separated from each other, so that an edge amount and a remaining amount of the low-frequency component may be independently adjusted. Meanwhile, a processing overhead increases as compared with the first and second exemplary embodiments. Therefore, it is effective that in a back liquid crystal monitor, an edge component having a small calculation amount is commonly used together with a luminance component to perform display in a simplified manner. On the other hand, at the time of recording, the edge component and the luminance component may be separated and used separately.

A fourth exemplary embodiment is a method for acquiring an equivalent appearance (effect) in viewing images of different sizes, even when a plurality of image sizes of a target image subjected to watercolor-like processing is set. In gradation processing of the image, when image sizes (pixel number) of input images are different from each other, a blurring degree seems to be different even in the same shrinkage size. For example, when a recording image recorded in a recording medium and a display image displayed through the display unit 112 on a back liquid crystal which is a display medium are set different in the shrinkage size, the same effect is not obtained when the same viewing image size is set. Therefore, in the exemplary embodiment, shrinkage sizes required to generate the small blurring image and the large blurring image are set appropriate according to the image size of the input image.

Figure 11:
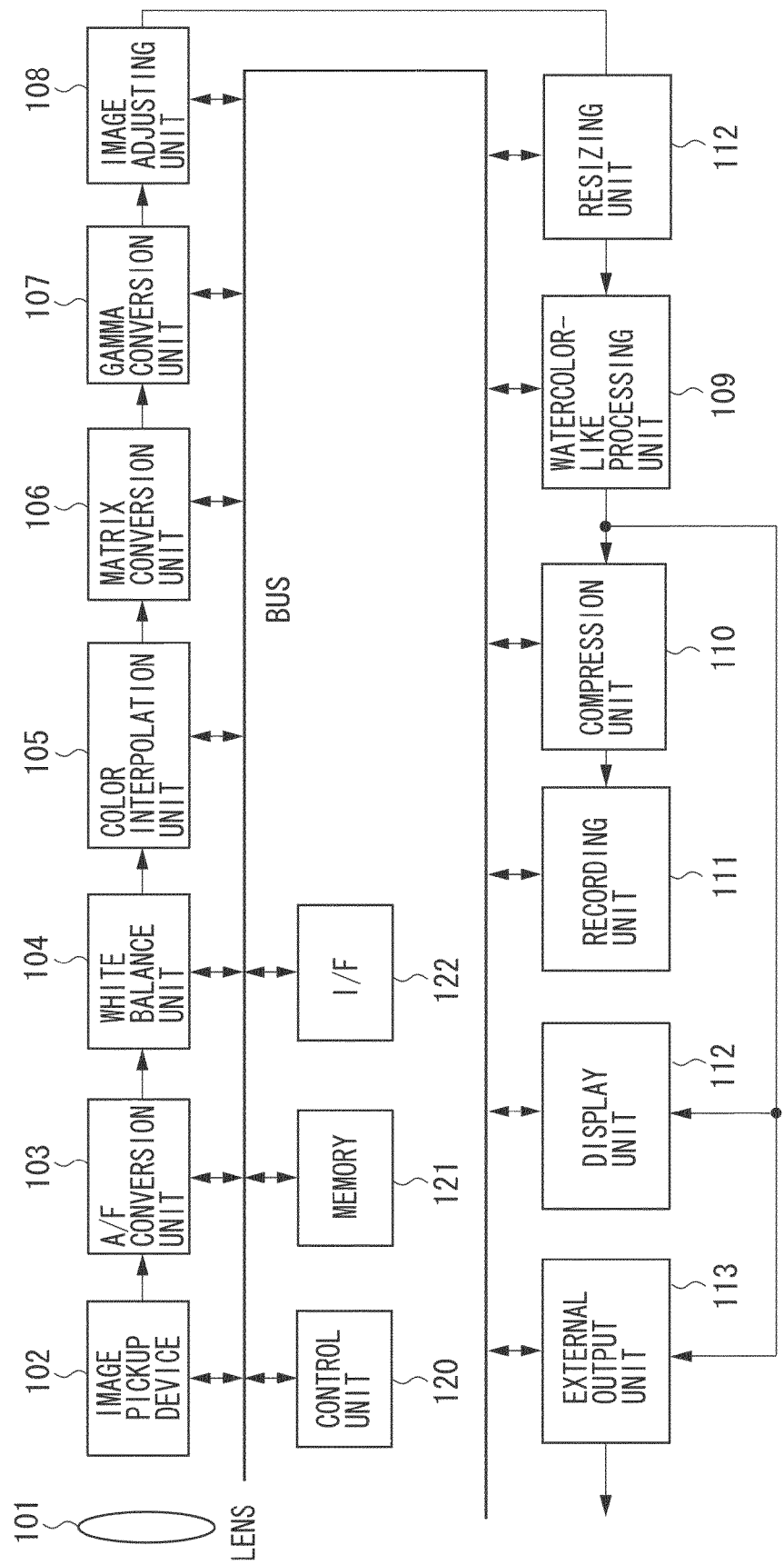
FIG. 11 is a block diagram illustrating an image processing apparatus according to a fourth exemplary embodiment.
Figure 12:
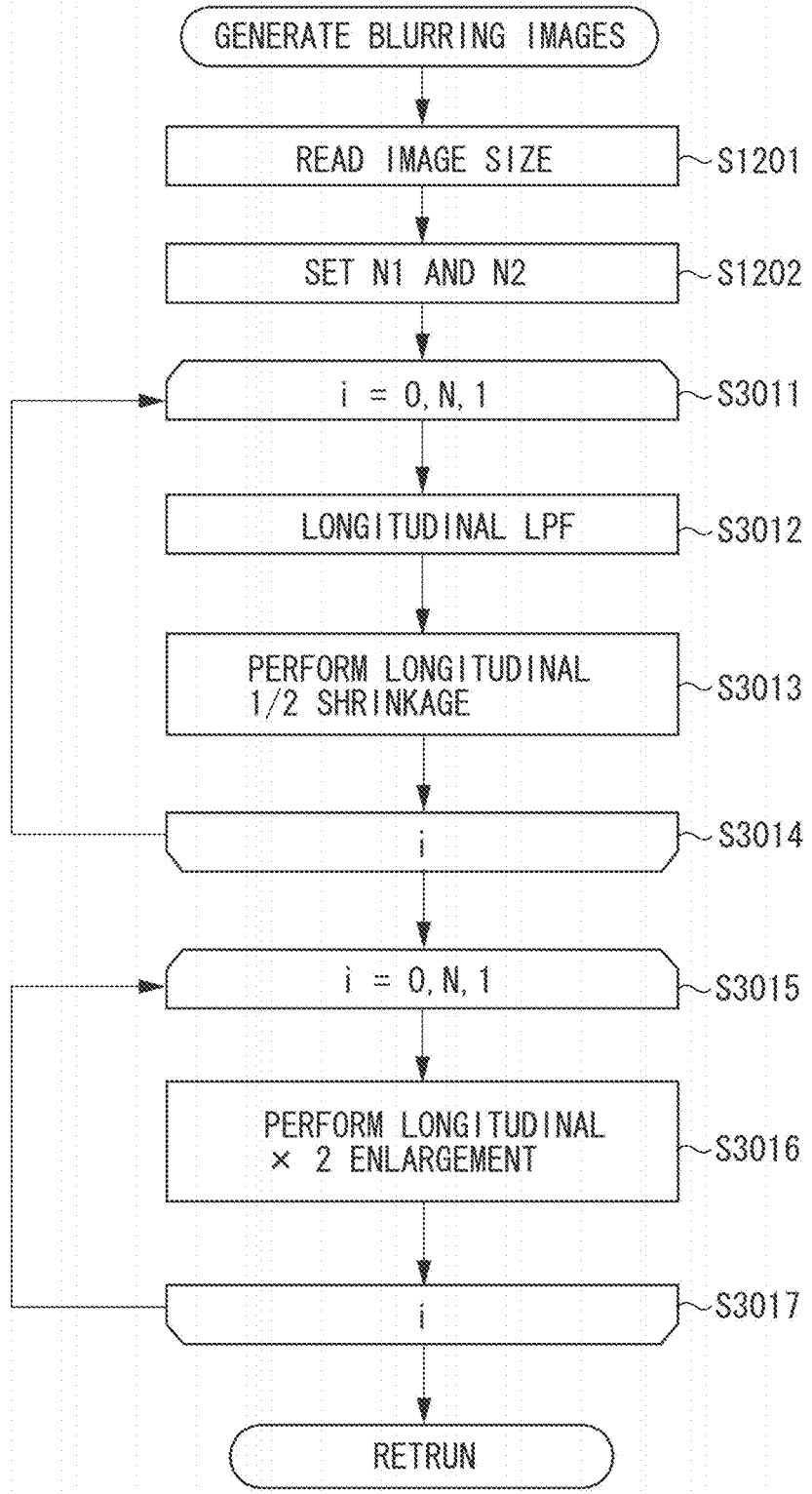
FIG. 12 is a flowchart illustrating an operation of blurring image generation processing according to the fourth exemplary embodiment.

FIG. 11 is a block diagram of an image processing apparatus according to a fourth exemplary embodiment and FIG. 12 is a flowchart of blurring image generation processing according to the fourth exemplary embodiment. As a feature of FIG. 11, a resize unit 112 is provided at a front side stage of the watercolor-like processing unit 109. Further, FIG. 12 is different from the flowchart of the blurring image generation processing of FIG. 3B according to the first exemplary embodiment in that steps S1201 and S1202 are provided.

In step S1201, an image size of an input image is read out as an image shooting condition 1099 and in step S1202, the number of shrinkage times N1 in the small blurring image generating unit and the number of shrinkage times N2 in the large blurring image generating unit are set depending on the image size illustrated in FIG. 13. Subsequent processing is performed similarly as in the first exemplary embodiment according to the set N1 and N2.

In a correspondence table of the number of shrinkage times illustrated in FIG. 13, one time shrinkage represents ½ shrinkage. As the image size is decreased, the number of shrinkage times is reduced.

As described above, in the exemplary embodiment, in the watercolor-like processing of adding the watercolor-like effect, the luminance data including the high-frequency component and the low-luminance low-frequency component is extracted from the luminance data of the input image and the final image data is obtained by adding gradated color data to generate a watercolor-like image. As a result, the rough line drawing is authentically depicted and image processing of generating the watercolor image with the color of the input image as a basic color may be implemented.

Further, in the exemplary embodiment, the number of shrinkage times when generating the blurring image is set according to the image size of the input image, so that the similar watercolor-like effect can be achieved even in viewing with the same image size a plurality of images having different image sizes.

In each exemplary embodiment, hardware configuration of each block of the watercolor-like processing unit 109 has been described. However, since any operation of each block can be implemented by software, some or all of the operations of the watercolor-like processing unit 109 may be installed by software processing. Further, similarly, some or all of operations of other blocks in the image processing apparatus of FIG. 1 may be installed by the software processing.

Further, in each exemplary embodiment, the example has been described in which gradation correction is performed by the one-dimensional LUT in the gradation correcting units 1093 and 801. However, the method of the gradation correction is not limited thereto. So long as the gradation correction having the equivalent effect of the features illustrated in FIGS. 4 and 9 is performed, the present invention is applicable. For example, an output pixel value may be obtained by a calculation operation.

Further, in each exemplary embodiment as above described, the YUV data divided into the luminance data and the color data, in other words, the data after development processing, is used as an example as the input image for the processing. However, the present invention is not limited thereto and may be applied also to image data including data of each color of RGB. In this case, for example, after conversion into the image data including the luminance data and the color data by a matrix operation, which is performed by the matrix conversion unit 106, the processing described in each exemplary embodiment may be performed.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-130098 filed Jun. 7, 2012, which is hereby incorporated by reference herein in its entirety.

What is claimed is:

1. An image processing apparatus, comprising:
one or more computer-readable memory; and
one or more processors that are coupled to the one or more computer-readable memory and that are configured to implement
an extraction unit configured to extract a high-frequency component and a low-luminance low-frequency component, from luminance data of an input image;
a color blurring unit configured to perform gradation processing to smooth data on color data of the input image; and
an output unit configured to output image data in which the extracted high-frequency component and the extracted low-luminance low-frequency component output from the extraction unit are used as luminance data and the output from the color blurring unit is used as color data.

2. The image processing apparatus according to claim 1, wherein
the extraction unit includes,
a luminance blurring unit configured to perform gradation processing to smooth data on the luminance data of the input image,
a gradation correcting unit configured to perform gradation correction processing on the luminance data output from the luminance blurring unit,
a subtraction unit configured to subtract the luminance data of the input image from the luminance data output from the gradation correcting unit, and
an inversion unit configured to invert a pixel value of the luminance data output from the subtraction unit.

3. The image processing apparatus according to claim 2, wherein the gradation correcting unit performs gradation correction such that a pixel value as an output value is equal to or larger than a pixel value as an input value.

4. The image processing apparatus according to claim 3, wherein the gradation correcting unit performs gradation correction such that a gain added to a pixel value of luminance lower than predetermined luminance is higher than a gain added to a pixel value of luminance higher than predetermined luminance.

5. The image processing apparatus according to claim 2, wherein the luminance blurring unit and the color blurring unit change a gradation degree in the gradation processing according to an image size of the input image and make an output image from the output unit viewable with an equivalent gradation degree when the output image is viewed with the same image size.

6. The image processing apparatus according to claim 2, wherein the luminance blurring unit and the color blurring unit increase the gradation degree of the gradation processing as the image size of the input image increases.

7. The image processing apparatus according to claim 2, wherein the gradation correcting unit performs gradation correction based on an image capturing condition in which the input image is captured.

8. The image processing apparatus according to claim 2, wherein the one or more processors are further configured to implement:
- a determination unit configured to determine a scene in which the input image is captured,
- wherein the gradation correcting unit performs gradation correction based on a determination result by the determination unit.

9. The image processing apparatus according to claim 2, wherein the gradation correcting unit performs gradation correction such that a gain added to a pixel value of luminance lower than predetermined luminance is larger when the scene where the input image is captured is determined to be a portrait, than gains in other cases.

10. The image processing apparatus according to claim 2, wherein the gradation correcting unit performs gradation correction such that a gain added to a pixel value of luminance lower than predetermined luminance is smaller when the scene where the input image is captured is determined to be a landscape, than gains in other cases.

11. The image processing apparatus according to claim 2, wherein the gradation correcting unit performs gradation correction on the luminance data output from the luminance blurring unit by using a look-up table.

12. The image processing apparatus according to claim 1, wherein
the extraction unit includes,
- a luminance blurring unit configured to perform gradation processing to smooth data on the luminance data of the input image,
- a subtraction unit configured to subtract the luminance data of the input image from the luminance data output from the luminance blurring unit,
- a gradation correcting unit configured to perform gradation correction processing such that luminance data of luminance lower than predetermined luminance is extracted from the luminance data of the input image, and
- an addition unit configured to add an output from the subtraction unit to an output from the gradation correcting unit.

13. The image processing apparatus according to claim 2, wherein the gradation degree of the gradation processing performed on the color data of the input image by the color blurring unit is higher than the gradation degree of the gradation processing performed on the luminance data of the input image by the luminance blurring unit.

14. An image processing method, comprising:
- extracting a high-frequency component and a low-luminance low-frequency component from luminance data of an input image;
- performing gradation processing to smooth data on color data of the input image; and
- outputting image data in which the extracted high-frequency component and the extracted low-luminance low-frequency component are used as luminance data and color data that has been gradation processed is used as color data.

15. A non-transitory computer-readable medium storing a program executable by an information processing apparatus, for executing the image processing method according to claim 14.

16. An image processing apparatus, comprising;
- a blurred image generating unit configured to generate a first blurred image and a second blurred image, from a same input image, wherein the first blurred image is smaller in a degree of gradation than the second blurred image;
- a gradation correcting unit configured to perform gradation correction processing on the first blurred image;
- an edge extracting unit configured to generate an edge image by subtracting the input image from the first blurred image;
- a gradation inversion unit configured to invert gradation of the edge image;
- a combining unit configured to combine the edge image in which gradation is inverted as luminance data and the second blurred image as color data, to output one image data.

17. The image processing apparatus according to claim 16, wherein the gradation correcting unit is configured to perform gradation correction such that a gain added to a pixel value of luminance lower than predetermined luminance is higher than a gain added to a pixel value of luminance higher than the predetermined luminance.

18. The image processing apparatus according to claim 16, wherein the gradation correcting unit is configured to perform gradation correction based on an image capturing condition in which the input image is captured.

* * * * *